US009661513B2

(12) United States Patent
Devarasetty

(10) Patent No.: US 9,661,513 B2
(45) Date of Patent: May 23, 2017

(54) METHODS, SYSTEMS, AND COMPUTER READABLE MEDIA FOR ENHANCED CHANNEL CONTROL ELEMENT (CCE) DECODING IN LTE NETWORKS

(71) Applicant: Ixia, Calabasas, CA (US)

(72) Inventor: Prasada Rao Devarasetty, Cary, NC (US)

(73) Assignee: IXIA, Calabasas, CA (US)

( * ) Notice: Subject to any disclaimer, the term of this patent is extended or adjusted under 35 U.S.C. 154(b) by 155 days.

(21) Appl. No.: 14/735,083

(22) Filed: Jun. 9, 2015

(65) Prior Publication Data
US 2016/0366604 A1    Dec. 15, 2016

(51) Int. Cl.
*H04W 24/06* (2009.01)
*H04W 76/04* (2009.01)
*H04W 48/12* (2009.01)
*H04W 74/00* (2009.01)
*H04W 88/02* (2009.01)

(52) U.S. Cl.
CPC .......... *H04W 24/06* (2013.01); *H04W 48/12* (2013.01); *H04W 74/002* (2013.01); *H04W 76/046* (2013.01); *H04W 88/02* (2013.01)

(58) Field of Classification Search
CPC ... H04W 24/06; H04W 48/12; H04W 74/002; H04W 76/046; H04W 88/02
See application file for complete search history.

(56) References Cited

U.S. PATENT DOCUMENTS

| 9,204,325 | B2 | 12/2015 | Subramanian et al. |
| 2009/0196244 | A1* | 8/2009 | Chun ............... H03M 13/09 370/329 |
| 2010/0165847 | A1 | 7/2010 | Kamuf et al. |
| 2010/0303011 | A1 | 12/2010 | Pan et al. |
| 2010/0331030 | A1* | 12/2010 | Nory ............... H04L 5/0053 455/509 |
| 2011/0076962 | A1 | 3/2011 | Chen et al. |
| 2011/0110315 | A1 | 5/2011 | Chen et al. |
| 2012/0094651 | A1 | 4/2012 | Chun et al. |
| 2013/0010724 | A1* | 1/2013 | Han ............... H04L 5/0007 370/329 |

(Continued)

FOREIGN PATENT DOCUMENTS

WO    WO 2013/096585 A1    6/2013

OTHER PUBLICATIONS

Non-Final Office Action for U.S. Appl. No. 13/336,005 (Dec. 4, 2014).

(Continued)

*Primary Examiner* — Ajay Cuttungal
(74) *Attorney, Agent, or Firm* — Jenkins, Wilson, Taylor & Hunt, P.A.

(57) ABSTRACT

Methods, systems, and computer readable media for enhanced channel control element (CCE) decoding are disclosed. According to one method that occurs in a multi-UE simulator, the method includes receiving physical downlink control channel (PDCCH) data from an evolved node B (eNode B) under test and decoding, using CCE avoidance information for avoiding at least a first CCE successfully identified as being associated with at least a first UE simulated by the multi-UE simulator, a second CCE associated with a second UE simulated by the multi-UE simulator.

20 Claims, 5 Drawing Sheets

(56) References Cited

U.S. PATENT DOCUMENTS

| | | | |
|---|---|---|---|
| 2013/0034062 A1 | 2/2013 | Seo et al. | |
| 2013/0058240 A1* | 3/2013 | Kim | H04L 5/0007 370/252 |
| 2013/0058294 A1 | 3/2013 | Miki et al. | |
| 2013/0058306 A1* | 3/2013 | Noh | H04L 1/1671 370/329 |
| 2013/0070689 A1 | 3/2013 | Liu et al. | |
| 2013/0070690 A1* | 3/2013 | Moon | H04L 5/001 370/329 |
| 2013/0088973 A1* | 4/2013 | Yang | H04L 5/003 370/241 |
| 2013/0121168 A1 | 5/2013 | Luo et al. | |
| 2013/0121295 A1 | 5/2013 | Saito et al. | |
| 2013/0155872 A1* | 6/2013 | Subramanian | H04W 24/06 370/242 |
| 2015/0023290 A1* | 1/2015 | Tang | H04W 72/042 370/329 |

OTHER PUBLICATIONS

Notice of Publication for GB Patent Application No. 1411056.3 (Aug. 11, 2014).

Final Office Action for U.S. Appl. No. 13/336,005 (Feb. 26, 2014).

Non-Final Office Action for U.S. Appl. No. 13/336,005 (Jul. 2, 2013).

Notification of Transmittal of the International Search Report and the Written Opinion of the International Searching Authority, or the Declaration for International Application No. PCT/US2012/070877 (Mar. 28, 2013).

Fraser, "LTE Channel State Information (CSI)," Agilent Technologies, pp. 1-66 (Copyright 2012).

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0, pp. 1-122 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0, pp. 1-79 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10,3.0, pp. 1-103 (Sep. 2011).

"PDCCH Blind Decoding," PDCCH Decoding Example, http://www.steepestascent.com, pp. 1-6 (Copyright Feb. 11, 2009, downloaded from the Internet Dec. 4, 2011).

Dahlman et al., "10.4.9: Blind Decoding of PDCCHs," 4G LTE / LTE-Advanced for Mobile Broadband, pp. 199-202 (2011).

Rohdes & Schwarz, "R & S® TS 8980 test system analyzes LTE quality indicators: CQI, PMI and RI," News 203/11, pp. 6-9 (2011).

Examination Report under Section 18(3) for Great Britain Patent Application No. 1411056.3 (May 3, 2016).

Notice of Allowance and Fee(s) Due for U.S. Appl. No. 13/336,005 (Jul. 29, 2015).

* cited by examiner

US 9,661,513 B2

METHODS, SYSTEMS, AND COMPUTER READABLE MEDIA FOR ENHANCED CHANNEL CONTROL ELEMENT (CCE) DECODING IN LTE NETWORKS

TECHNICAL FIELD

The subject matter described herein relates to communications processing. More particularly, the subject matter described herein relates to methods, systems, and computer readable media for enhanced CCE decoding.

BACKGROUND

Multiple user equipment (multi-UE) simulators simulate multiple UEs connected to one or more evolved node Bs (eNode Bs) under test. UEs are wireless devices, such as mobile handsets, and evolved node Bs are the wireless access devices in LTE or LTE advanced (LTE-A) networks through which the UEs attach to the network. UEs that are connected to an eNode B are hereinafter referred as attached UEs. For each UE being simulated, the multi-UE simulator is required to decode multiple control channels, one of which is referred to as the physical downlink control channel (PDCCH). The PDCCH contains downlink control information (DCI), which contains a resource mapping (e.g., frequencies, modulation, data block length, etc.) for decoding user data transmitted on a different channel, referred to as the physical downlink shared channel (PDSCH) or resource mapping for sending user data on a different channel, referred to as the physical uplink shared channel (PUSCH). During a given transmission time interval (TTI) and/or subframe, the simulator is not aware of the UEs to which the eNode B is sending the control information. Accordingly, the simulator is required to monitor the PDCCH channel for all possible DCI values corresponding to the attached UEs that might be present in the PDCCH channel. Monitoring the control channel includes attempting to decode the PDCCH data with a radio network temporary identifier (RNTI) for each UE being simulated. Since DCI decoding is time sensitive and since a multi-UE simulator may perform DCI decoding for multiple simulated UEs, it is important that the simulator performs DCI decoding quickly and efficiently. Moreover, some of the DCIs that are decoded may be false. For example, a DCI may correspond to an unattached UE that is not being simulated but for which the eNode B transmits a DCI during a given transmission time interval. Some DCIs may be false DCIs because of the nature of the PDCCH channel and particularly given the fact that coding for DCIs is relatively weak in LTE networks. False DCIs may lead to invalid decoding of PDSCH data, interpretation and corruption of valid downlink data of another UE, unexpected ACKs and NACKs transmitted on uplink channels and corruption of a valid uplink transmission of another UE.

Accordingly, there exists a need for methods, systems, and computer readable media for enhanced CCE decoding.

SUMMARY

Methods, systems, and computer readable media for enhanced channel control element (CCE) decoding are disclosed. According to one method that occurs in a multi-UE simulator, the method includes receiving physical downlink control channel (PDCCH) data from an evolved node B (eNode B) under test and decoding, using CCE avoidance information for avoiding at least a first CCE successfully identified as being associated with at least a first UE simulated by the multi-UE simulator, a second CCE associated with a second UE simulated by the multi-UE simulator.

The subject matter described herein can be implemented using a non-transitory computer readable medium having stored thereon executable instructions that when executed by the processor of a computer control the computer to perform steps. For example, the subject matter described herein can be implemented in software executed by a processor. Exemplary computer readable media suitable for implementing the subject matter described herein also include chip memory devices, disk memory devices, programmable logic devices, including field programmable gate arrays, and application specific integrated circuits. In addition, a computer readable medium that implements the subject matter described herein can be located on a single device or computing platform or may be distributed across plural devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The subject matter described herein relates to methods, systems, and computer readable media for enhanced downlink control information (DCI) decoding. A multi-UE simulator may simulate multiple user equipment (UEs) for testing various nodes (e.g., an evolved node B (eNode B)) in a communications network (e.g., long term evolution (LTE) network). Generally, a UE may receive and decode DCI stored as control channel elements (CCEs) in a CCE group on a physical downlink control channel (PDCCH). The UE can use the decoded DCI for determining when and how to send and receive information to and from an eNode B. When simulating multiple UEs, each simulated UE may monitor and decode all CCEs that are broadcast on a PDCCH during a transmission time interval (TTI). A CCE group may contain 1, 2, 4, or 8 individual CCEs, and a CCE is comprised of 9 resource blocks (RBs). A UE typically decodes each CCE in a CCE group in a stepwise, serial fashion. Once the UE decodes a particular CCE, the necessary DCI information can be extracted and that UE continues to look for additional control information that may belong to this UE, if any, in the entire search space. The next UE then begins a new search of the entire CCE group anew, decoding and looking for its CCE(s). However, the process is slow and resource intensive, and can be problematic for a multi-UE simulator (e.g., when trying to simulate large numbers of UEs attached to an eNode B at one time) and can lead to false detections.

In accordance with some aspects of the subject matter described herein, techniques, methods, and/or mechanisms are provided for performing enhanced DCI decoding. For example, a multi-UE simulator may store CCE avoidance information (e.g., CCE blocking information) so that the space (e.g., CCE locations) determined to be associated with another (e.g., a preceding) UE can be avoided in the search space when attempting to decode DCI for subsequent UEs during a TTI. In this example, by keeping track of search space that is associated with preceding UEs, the multi-UE simulator may search progressively less search space for decoding DCI for each subsequent UE.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
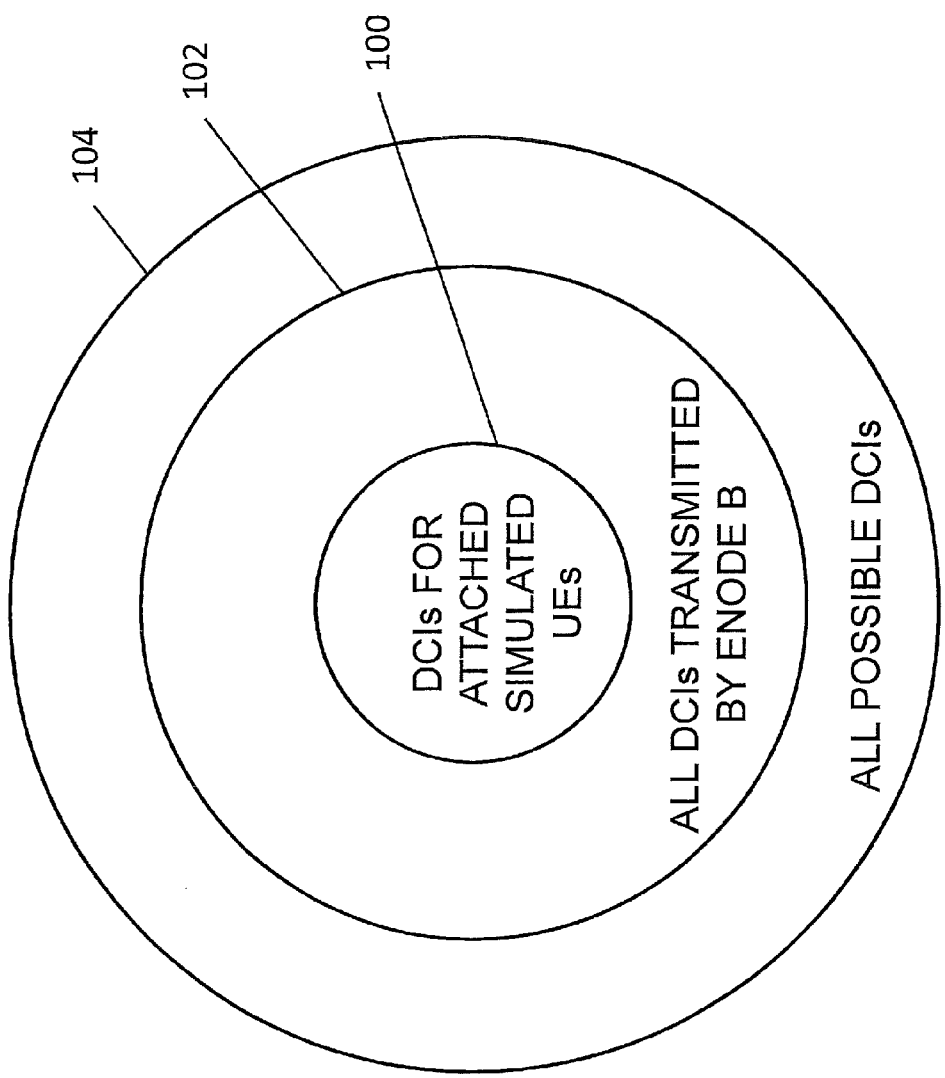
FIG. 1 is a Venn diagram illustrating possible DCI values that can be decoded using blind DCI decoding.

FIG. 1 is a Venn diagram illustrating the complete universe of possible DCI values that may be decoded by a multi-UE simulator. Referring to FIG. 1, circle 100 represents DCI values of attached simulated UEs that were transmitted during a given transmission time interval (TTI) and/or subframe. Circle 102 represents all DCIs transmitted by an eNode B during any given transmission time interval (TTI) and/or subframe. The area between circles 100 and 102 may include potentially false DCIs for attached UEs (i.e., potentially valid DCIs, but that were not transmitted during a given TTI). Finally, circle 104 represents all possible DCIs in the system that may include UEs not attached and/or not simulated.

In accordance with some aspects of the subject matter described herein, a multi-UE simulator or a related entity (e.g., an enhanced DCI decoder) may be configured to identify DCI values of attached simulated UEs that were actually transmitted during a TTI and/or subframe, i.e., within circle 100, and exclude from further processing DCIs that are between circles 100 and 102 and between circles 100 and 104. For example, a multi-UE simulator or a related entity may be configured with the ability to identify valid DCIs for UEs with a configurable level of error tolerance (e.g., based on an error tolerance value) and to store related information such that these previously identified DCIs are not mistakenly associated with other (e.g., subsequent) UEs, e.g., during a given TTI.

Figure 2:
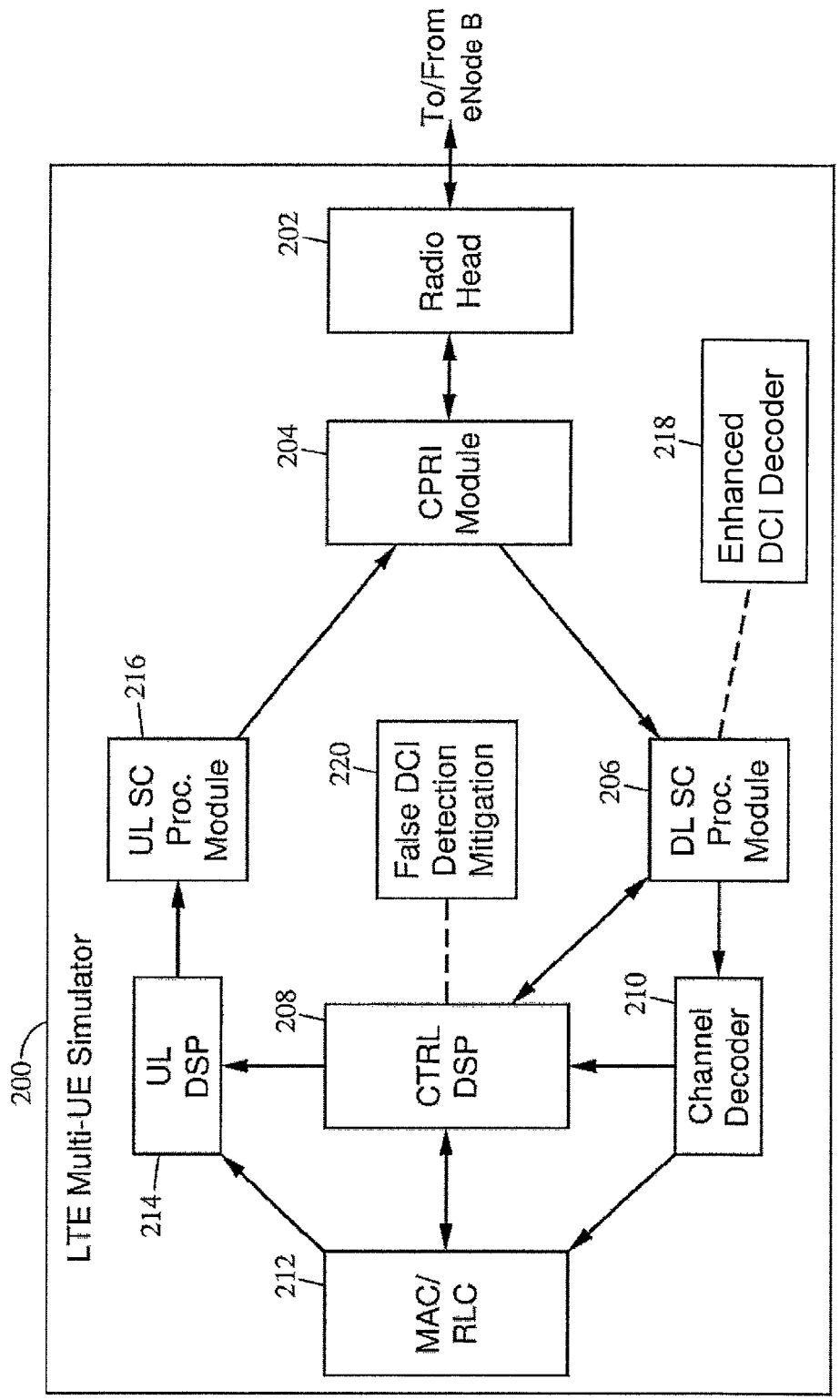
FIG. 2 is a block diagram illustrating a multi-UE simulator configured to perform enhanced DCI decoding according to an embodiment of the subject matter described herein.

FIG. 2 is a block diagram illustrating a multi-UE simulator 200 according to an embodiment of the subject matter described herein. Referring to FIG. 2, multi-UE simulator 200 may represent any suitable entity (e.g., software executing on one or more processor, an application-specific integrated circuit (ASIC), a field-programmable gate array (FPGA), etc.) for testing network nodes or related functionality associated with an LTE network, an LTE advanced (LTE-A) network, or other communications network. For example, multi-UE simulator 200 may include functionality for simulating multiple user devices (e.g., LTE UEs) for testing various nodes (e.g., an evolved node B (eNode B)) in an LTE communications network.

Multi-UE simulator 200 may include a radio head 202 for sending data to and receiving data from an evolved node B over an LTE wireless interface. A common public radio interface (CPRI) module 204 may receive data in the downlink direction for further processing and sends data in the uplink direction to radio head 202. Radio head 202 may be internal to or external to multi-UE simulator 200. For example, in one test scenario, radio head 202 may be omitted or bypassed, and CPRI module 204 may connect to a corresponding CPRI interface of an eNode B under test via a wired interface, such as an optical fiber interface.

A downlink signal chain processing module 206 may receive and process downlink data and forwards the control channel data to control DSP 208. At the transmitting side of eNode B, the DCI PDU for each UE may go through standard physical layer processing blocks, such as CRC, channel coding, rate matching, modulation, layer mapping, and it is then mapped to downlink transmission resources assigned to one of the PDCCHs in a subframe. To decode a DCI, multi-UE simulator 200 may perform the inverse of these operations.

Figure 3:
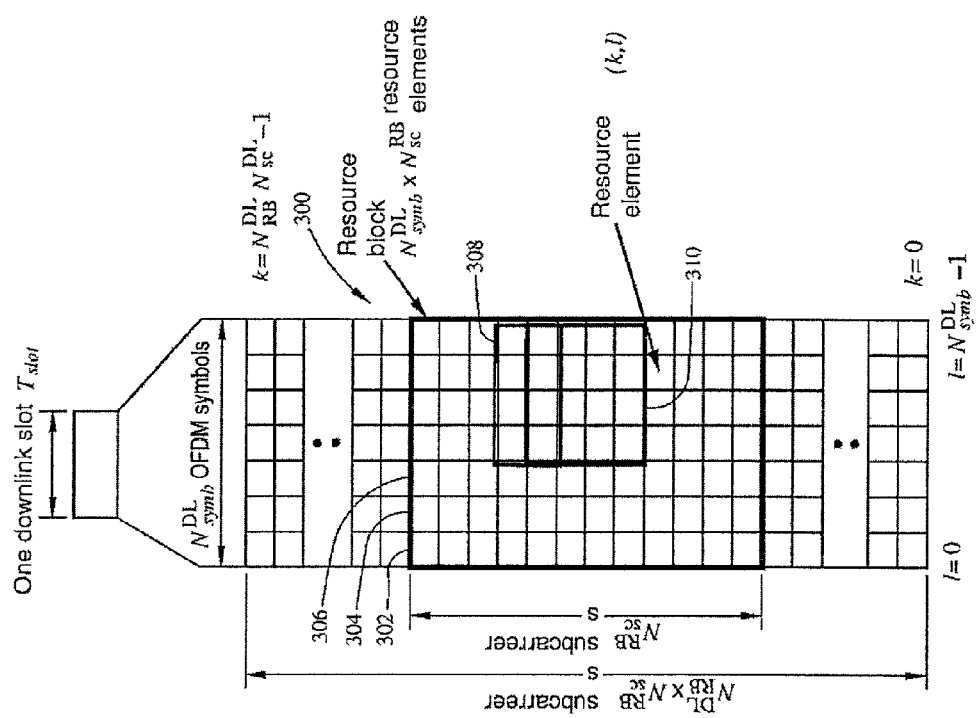
FIG. 3 is a block diagram of a downlink LTE resource grid used to transmit data from an eNode B to a multi-UE simulator according to an embodiment of the subject matter described herein.

FIG. 3 is a diagram illustrating a downlink resource grid that may be used by an eNode B to transmit PDCCH data to multi-UE simulator 200. Referring to FIG. 3, a downlink resource grid 300 is divided according to time on the horizontal axis and frequency on the vertical axis. Each block in resource grid 300 is referred to as a resource element, i.e., a resource element is one of the cells in resource grid 300. A resource block, indicated by the bold box, contains a number of consecutive orthogonal frequency domain multiplexing (OFDM) symbols in the time domain and consecutive subcarriers in the frequency domain. Each column in the resource block corresponds to an OFDM symbol. A resource element group is used to define the mapping of control channels to resource elements. A resource element group is a set of resource elements in the same column or symbol. The number of resource element groups in a given symbol over one resource block can be two or three depending on the number of cell-specific reference signals that are configured. For example, in FIG. 3, each of symbols 302, 304, and 306 for that resource block can include two or three resource element groups. The mapping of PDCCH data symbols to resource element groups is set forth in section 6.2.5 of 3GPP TS 36.211v10.3.0 (2011-09), the disclosure of which is incorporated herein by reference in its entirety.

A PDCCH is transmitted on an aggregation of one, two, four, or eight consecutive control channel elements (CCEs), where a control channel element corresponds to nine resource element groups. Thus, in FIG. 3, assuming one of the first three OFDM symbols 302, 304, or 306 carries 3 resource element groups for a resource block, one CCE in a symbol may spread over 3 resource blocks. The number of CCEs available in each subframe limits the maximum number PDCCH data and corresponding DCIs in that subframe. The number of CCEs per subframe depends on number of OFDM symbols for control channel data (PDCCH symbols), PHICH resources, and system bandwidth. For example, number of CCEs with a configuration of 20 MHz system bandwidth, 3 PDCCH symbols, and PHICH resource of $\frac{1}{6}^{th}$ is about 88. This means there can be a maximum of 88 DCIs in one subframe. From the available set of CCEs, eNode B selects one or a subset of CCEs to transmit PDCCH data for a specific UE. Selection of a specific subset of CCEs in a subframe for PDCCH data for a specific UE is a function of UE's RNTI value. In other words, each UE is assigned only within a subset of CCEs, called a search space, for PDCCH assignment, which is based on the UE's RNTI value.

The PDCCH supports multiple formats and the format governs the number of resource element groups used. Table 1 shown below illustrates PDCCH formats and corresponding number of resource element groups, number of CCEs and PDCCH data unit size.

TABLE 1

Supported PDCCH formats.

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Thus, decoding the PDCCH may include analyzing the first one, two or three OFDM symbols in each subframe (twice the time slot) to determine whether PDCCH data for each UE being simulated is carried by a given CCE or group of CCEs. The process may be repeated for each possible PDCCH format because multi-UE simulator 200 does not know which PDCCH format was used by the eNode B in a given subframe.

In some embodiments, multi-UE simulator 200 may include functionality for monitoring different DCI formats. For example, section 5.3.3.1 of 3GPP TS 36.212, V10.3.0 (2011), the disclosure of which is incorporated herein by reference in its entirety, specifies DCI formats that can be used by the eNode B in transmitting the DCI to an UE. For example, DCI format 0 is used for scheduling of the PUSCH data in the uplink, DCI format 1 is used for the scheduling of one codeword of PDSCH data in the downlink, DCI format 1A is used for the compact scheduling of one PDSCH data, etc. Each DCI format has different parameters and size (number of bits) that may be decoded.

Because multi-UE simulator 200 does not know which DCI format is used on the downlink channel, multi-UE simulator 200 may blindly decode PDCCH for all possible DCI formats, which can result in multiple valid DCI types for the same CCE or group of CCEs. For example, DCI formats 1 and 1A may decode for the same set of CCEs, and both DCIs may correspond to attached UEs. However, only DCI format 1 was actually transmitted. As a result, multi-UE simulator 200 may perform one or more of the steps listed below to identify one DCI as true or valid and/or identify the other as false.

The different PDCCH formats described above with regard to Table 1 correspond to different aggregation levels. For example, PDDCH format zero corresponds to aggregation level 1, and PDDCH format 2 corresponds to aggregation level 4. The aggregation level defines the number of control channel elements used to carry the PDCCH data for a particular UE. The possible UE-specific aggregation levels are 1, 2, 4, and 8. In addition, there are common aggregation levels of 4 and 8 which relate to common control information. Table 2 shown below illustrates exemplary aggregation levels that may be monitored by a UE or a device simulating multiple UEs.

TABLE 2

PDCCH candidates monitored by a UE.

| Search space $S_k^{(L)}$ | | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Thus, for a given set of control channel elements, for aggregation level 1, multi-UE simulator 200 may analyze 6 CCEs depending on the RNTI value in the set to determine whether the 6 CCEs contain a DCI for a UE being simulated. Multi-UE simulator 200 may then analyze the 12 CCEs depending on the RNTI value for aggregation level 2 to determine whether the 12 CCEs contain the DCI for the UE being simulated. The process may be repeated for aggregation levels 4 and 8 because multi-UE simulator 200 does not know what aggregation level was used to transmit the DCI for a given UE. Moreover, all of the aggregation levels may be tested for each UE being simulated. This process may result in plural DCI values, some of which fall within circles 102 and 104 but that may not fall within circle 100 illustrated in FIG. 1. DCIs outside of circle 102 may be excluded as false because these DCIs do not correspond to UEs being simulated. However, DCIs within circle 102 correspond to UEs being simulated, but cannot be blindly accepted as valid because some of the DCIs may not have been transmitted by the eNode B. Because multi-UE simulator 200 does not know which DCIs were transmitted during a given interval, false DCI detection mitigation may be implemented by multi-UE simulator 200.

Returning to FIG. 2, control DSP 208 may decode DCIs received from downlink signal chain processing module 206. For DCIs with downlink channel information, control DSP 208 may send a resource mapping (i.e., frequency, modulation, data block size, etc.) to downlink signal chain processing module 206 so that downlink signal chain processing module 206 can decode the downlink data on the PDSCH channel. In some embodiments, downlink signal chain processing module 206 may perform channel de-mapping or delineation of data for one or more UEs, demodulating and/or rate de-matching. A downlink channel decoder 210 decodes downlink data using a specified algorithm, such as Turbo decoding. MAC/RLC layer module 212 performs media access control (MAC) and radio link control (RLC) layer processing of received data.

For DCIs with uplink channel information, control DSP 208 may send uplink grant information to uplink DSP 214 and/or MAC/RLC layer module 212, and a resource mapping (i.e., frequencies, modulation, etc.) to uplink signal processing module 216. Uplink DSP 214 may generate uplink frames using the data blocks received from MAC/RLC layer module 212 and may transmit them to uplink signal chain processing module 216 for transmission over the radio link via CPRI module 204 and radio head 202. Optionally, as stated above, uplink data may be sent directly to the eNode B under test from CPRI module 204 via a wired interface, if it is desirable to test LTE functionality of the eNode B other than the radio interface.

In some embodiments, multi-UE simulator 200 or entities therein (e.g., downlink signal chain processing module 206 or control DSP 208) may include an enhanced DCI decoder 218 (also referred to herein as an enhanced CCE decoder) that performs blind DCI decoding. Blind DCI decoding may include using the radio network temporary identifier (RNTI) value for each attached UE being simulated by multi-UE simulator 200 during a given transmission time interval to detect or extract PDCCH data. In some embodiments, enhanced DCI decoder 218 may monitor a set of PDCCH candidates (a set of consecutive CCEs on which the PDCCH could be mapped) in every subframe. Monitoring the PDCCH candidates includes identifying possible valid DCIs that are present in a subframe.

In some embodiments, enhanced DCI decoder 218 may include functionality for progressively reducing a search space associated with DCI decoding. For example, for each TTI, enhanced DCI decoder 218 may search possible CCE locations for a CCE associated with a given simulated UE. In this example, as CCE locations are identified (e.g., found or determined to be associated with a simulated UE), CCE avoidance information may be stored such that enhanced DCI decoder 218 can avoid searching identified CCE locations when attempting to identify CCEs associated with subsequent UEs. Continuing with this example, during the TTI, as enhanced DCI decoder 218 decodes DCI for simulated UEs, the search space for DCI decoding is progressively reduced since enhanced DCI decoder 218 can search CCE locations that remain unidentified or unclaimed, but can ignore or avoid identified or claimed CCE locations.

In some embodiments, enhanced DCI decoder 118 may include functionality for storing CCE avoidance information. For example, enhanced DCI decoder 118 may use various data structures and/or data storage devices or related media. In this example, enhanced DCI decoder 118 may store CCE avoidance information for keeping track of which CCEs or CCE locations (e.g., search space) to search or avoid.

In some embodiments (e.g., where CCE avoidance information is used for storing CCE locations to search), CCE avoidance information may be stored in a CCE allowing data structure (e.g., an "unclaimed" data structure). For example, a CCE allowing data structure may include all possible CCE locations for a CCE group during a TTI and may be used by enhanced DCI decoder 118 for indicating CCE locations to search when attempting to decode DCI. In this example, as a CCE location is determined to be associated with a simulated UE during the TTI, enhanced DCI decoder 118 or another entity may remove the CCE location from the CCE allowing data structure, thereby reducing the search space for UEs whose DCI is subsequently decoded by enhanced DCI decoder 118 during the TTI since enhanced DCI decoder 118 may only search the potential CCE locations indicated in the CCE allowing data structure.

In some embodiments (e.g., where CCE avoidance information is used for storing CCE locations to avoid), CCE avoidance information may be stored in a CCE blocking data structure (e.g., a "claimed" data structure). For example, a CCE blocking data structure may include decoded or identified CCE locations (e.g., CCE locations that are determined to be associated with a simulated UE during a TTI) and may be used by enhanced DCI decoder 118 for indicating CCE locations to avoid when attempting to decode DCI. In this example, as a CCE location is determined to be associated with a simulated UE during the TTI, enhanced DCI decoder 118 or another entity may add the CCE location to the CCE blocking data structure, thereby reducing the search space for UEs whose DCI is subsequently decoded by enhanced DCI decoder 118 during the TTI since enhanced DCI decoder 118 may avoid searching the decoded CCE locations indicated in the decoded CCE locations data structure.

In some embodiments, a false DCI detection mitigation module 220 may perform various false DCI detection countermeasures to identify valid and/or invalid DCIs from the DCIs detected using blind DCI decoding. False DCI detection mitigation module 220 may be implemented by control DSP 208 as illustrated in FIG. 2, by downlink signal chain processing module 206, by a combination of control DSP 208 and downlink signal chain processing module 206 and control DSP 208 or by a stand-alone processing element.

In some embodiments, enhanced DCI decoder 118, false DCI detection mitigation module 220, and/or another entity may include functionality for determining whether an identified CCE location and/or a related CCE or DCI is valid. For example, prior to storing CCE avoidance information, enhanced DCI decoder 118 may determine whether an identified CCE yields valid DCI for a given UE. In this example, the determination may include using an error detection algorithm or formula for detecting a number of bit errors in the decoded DCI and an error tolerance value (e.g., no bit errors, less than two bit errors, etc.) which indicates how many errors are allowed when determining that the decoded DCI is valid. Continuing with this example, if a decoded DCI is determined to be valid (e.g., no bit errors were detected), enhanced DCI decoder 118 may store CCE avoidance information associated with the identified CCE. By checking the validity of DCI for each UE, enhanced DCI decoder 118, false DCI detection mitigation module 220, and/or another entity may avoid or mitigate false DCI detection.

It will be appreciated that FIGS. 2 and 3 are for illustrative purposes. Further, it will be appreciated that various components, their locations, and/or their functions as described above in relation to FIGS. 2 and 3 can be changed, altered, added, or removed.

Figure 4:
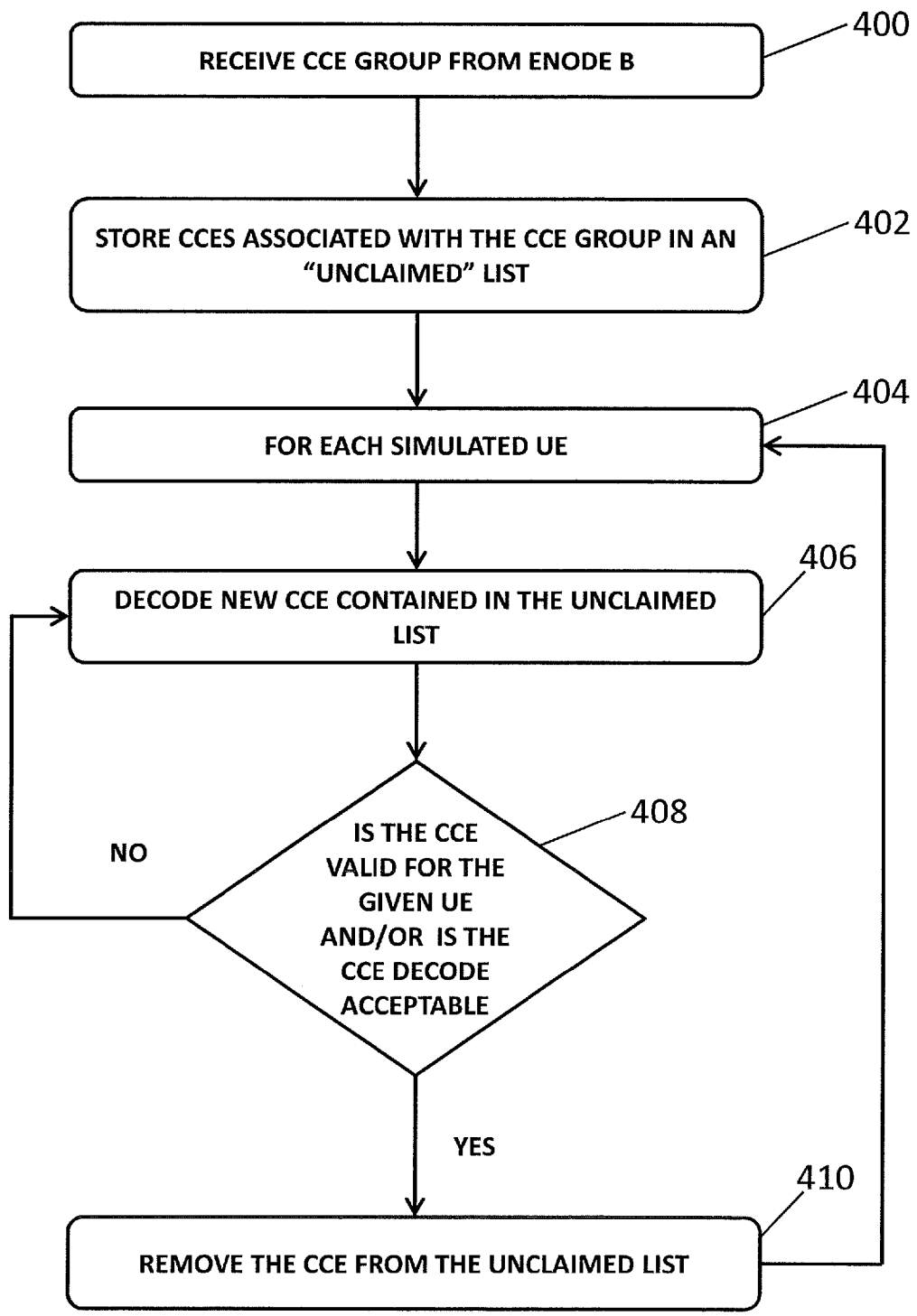
FIG. 4 is a flow chart illustrating a method for enhanced CCE decoding according to an embodiment of the subject matter described herein.

FIG. 4 is a flow chart illustrating a method for enhanced CCE decoding according to an embodiment of the subject matter described herein. In some embodiments, the method in FIG. 4, or portions thereof, may be performed by or at enhanced DCI decoder 218, multi-UE simulator 200, and/or another node or module.

In step 400, a new CCE group (e.g., one or more CCEs for carry encoded DCI information) is received from eNode B.

In step 402, all CCEs associated with the new CCE group are placed in an "unclaimed" list. As used herein, an "unclaimed" list may represent any suitable data structure or storage technique may include information for indicating one or more CCEs to search when performing blind DCI decoding.

In step 404, various steps (e.g., 406-410) may be iterated or performed for each simulated UE.

In step 406, a CCE contained in the "unclaimed" list is decoded. For example, a CCE in the "unclaimed" list (that has not previously been decoded for a particular simulated UE) may be decoded using a relevant RNTI.

In step 408, it is determined whether the CCE is valid for the given UE and/or whether CCE decode is acceptable. For example, after decoding a CCE into DCI bit errors may be determined and if the number of bit errors determined are less than or equal to an error tolerance value, it may be determined that the CCE is valid for the UE and that the CCE decode is acceptable. In this example, if the number of bit errors determined are more than an error tolerance value, it may be determined that the CCE is invalid for the UE and/or that the CCE decode is unacceptable.

If the CCE is determined to be invalid for the UE and/or that the CCE decode is determined to be unacceptable, step 406 may be repeated, e.g., if there is another CCE that has not yet been decoded for the UE.

If the CCE is determined to be valid for the UE and that the CCE decode is determined to be acceptable, step 410 may occur. For example, if a decoded CCE or related DCI has no bit errors, it may be determined that the CCE is valid for the UE and that the CCE decode is acceptable.

In step 410, the CCE is removed from the "unclaimed" list. For example, after being removed from the "unclaimed" list, the CCE will not be decoded using RNTIs associated with other UEs, thereby reducing the search space for finding relevant CCEs for the other UEs.

In some embodiments, after the CCE is claimed for the UE and assuming the UE does not have multiple related CCEs, step 404 may occur. For example, enhanced DCI decoder 218 may attempt to decode the remaining CCEs from the "unclaimed" list for one or more other UEs.

In some embodiments, after the CCE is claimed for the UE and assuming the UE has multiple related CCEs, step 406 may occur. For example, enhanced DCI decoder 218 may attempt to decode one or more remaining CCEs from the "unclaimed" list for the UE.

It will also be appreciated that FIG. 4 is for illustrative purposes and that different and/or additional steps than those depicted in FIG. 4 may be involved with DCI decoding.

Figure 5:
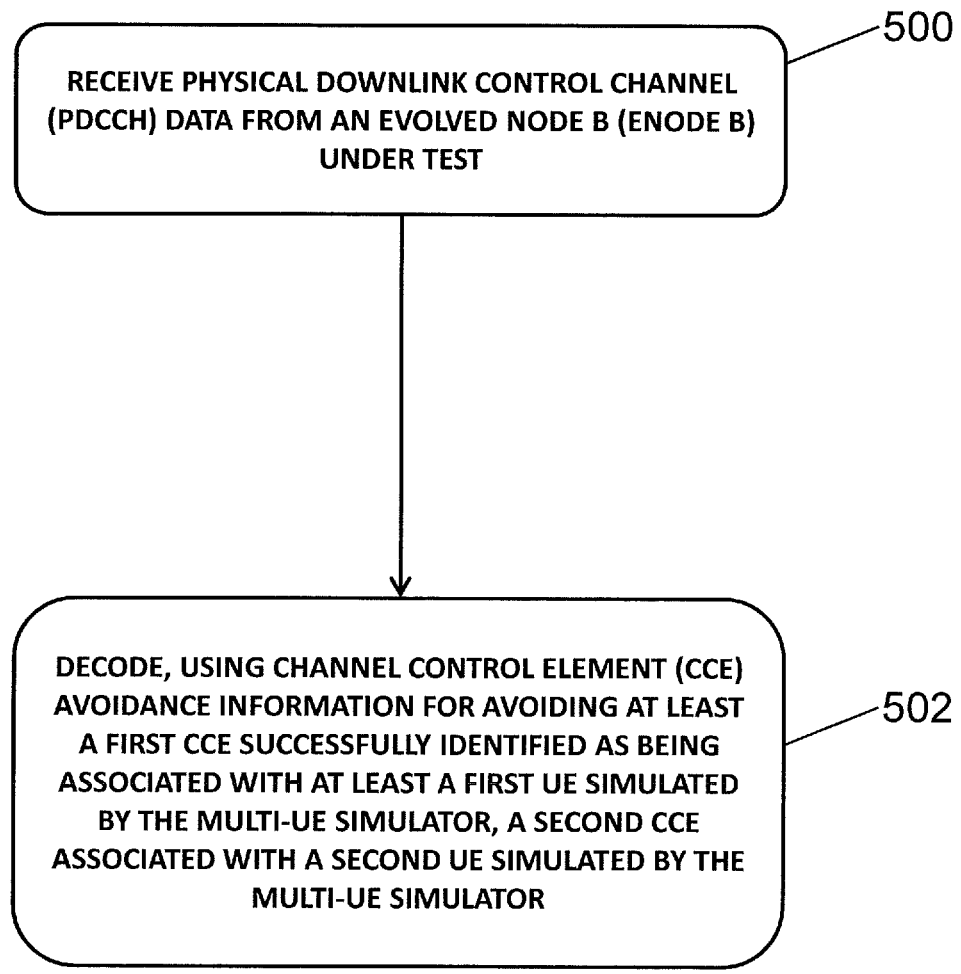
FIG. 5 is a flow chart illustrating a method for enhanced CCE decoding according to another embodiment of the subject matter described herein.

FIG. 5 is a flow chart illustrating a method for enhanced CCE decoding according to another embodiment of the subject matter described herein. In some embodiments, the method in FIG. 5, or portions thereof, may be performed by or at enhanced DCI decoder 218, multi-UE simulator 200, and/or another node or module.

In step 500, PDCCH data may be received from an eNode B under test. For example, multi-UE simulator 200 may receive PDCCH data from an eNode B, where the PDCCH data is stored in a CCE group containing 1, 2, 4, or 8 individual CCEs. In this example, each CCE in the CCE group may be associated with a particular UE simulated by multi-UE simulator 200.

In step 502, a second CCE may be decoded using CCE avoidance information for avoiding at least a first CCE successfully identified as being associated with at least a first UE simulated by multi-UE simulator 200. The second CCE may be associated with a second UE simulated by multi-UE simulator 200.

In some embodiments, CCE avoidance information may be updated (e.g., after each successful decoding of CCEs for each simulated UE) to include information for progressively reducing a search space for decoding CCEs during a CCE group processing cycle. For example, a CCE blocking list may be used for progressively reducing the search space associated with DCI decoding of a number of simulated UEs by multi-UE simulator 200 during a TTI.

In some embodiments, a CCE group processing cycle may include a TTI or an amount of processing for decoding CCEs associated with simulated UEs in a CCE group.

In some embodiments, e.g., after decoding a second CCE for a second UE, CCE avoidance information may be updated to include or exclude information indicating the second CCE.

In some embodiments, e.g., prior to updating CCE avoidance information to include or exclude information indicating a CCE, it may be determined whether a CCE is valid for a particular UE. For example, a CCE may be valid for a first UE simulated by multi-UE simulator 200, if after decoding the CCE (e.g., using an RNTI associated with the first UE) into DCI, the DCI includes no bit errors or is within an acceptable (e.g., user-configurable) error tolerance value or range.

In some embodiments, determining whether a CCE is valid for a UE may include decoding the CCE into DCI and determining whether the DCI satisfies an error tolerance value. For example, an error tolerance value may indicate that DCI for a given UE should have less than two bit errors. In this example, if a CCE is decoded into DCI and the resultant DCI has two or more bit errors, enhanced DCI decoder 218 may consider the CCE invalid and/or unrelated to a particular UE.

In some embodiments, decoding, using CCE avoidance information, a second CCE associated with a second UE simulated by multi-UE simulator 200 may include using the CCE avoidance information to exclude a first CCE successfully identified as being associated with a first UE from being decoded for the second UE.

In some embodiments, CCE avoidance information may utilize a claimed CCEs data structure indicating locations associated with decoded CCEs or an unclaimed CCEs data structure indicating locations associated with potential CCEs for decoding.

Multi-UE simulator 200, enhanced DCI decoder 218, and/or functionality described herein can be performed by special purpose computing platforms, such as an IxLoad™ testing platform manufactured by Ixia®. Multi-UE simulator 200, enhanced DCI decoder 218, and/or functionality described herein can improve the technological field of testing network nodes, UE simulators, and/or DCI decoding by providing techniques and/or mechanisms for more efficiently identifying DCI associated with multiple UEs by using CCE avoidance information to progressively reduce search space associated with DCI decoding. Further, multi-UE simulator 200, enhanced DCI decoder 218, and/or functionality described can improve the technological field of testing network nodes, UE simulators, and/or DCI decoding by providing techniques and/or mechanisms for more reducing or mitigating false DCI detection by setting an error tolerance value and performing a detection check using the error tolerance value.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for enhanced channel control element (CCE) decoding, the method comprising:
   in a multi-UE simulator:
      receiving physical downlink control channel (PDCCH) data from an evolved node B (eNode B) under test; and
      decoding, using channel control element (CCE) avoidance information for avoiding at least a first CCE successfully identified as being associated with at least a first UE simulated by the multi-UE simulator, a second CCE associated with a second UE simulated by the multi-UE simulator.

2. The method of claim 1 wherein the CCE avoidance information is updated, after each successful decoding of CCEs for each simulated UE, to include information for progressively reducing a search space for decoding CCEs during a CCE group processing cycle.

3. The method of claim 2 wherein the CCE group processing cycle includes a transmission time interval (TTI) or an amount of processing for decoding CCEs associated with simulated UEs in a CCE group.

4. The method of claim 1 comprising:
updating the CCE avoidance information to include or exclude information indicating the second CCE.

5. The method of claim 4 comprising:
prior to updating the CCE avoidance information, determining whether the second CCE is valid for the second UE.

6. The method of claim 5 wherein determining whether the second CCE is valid for the second UE includes decoding the second CCE into downlink control information (DCI) and determining whether the DCI satisfies an error tolerance value.

7. The method of claim 1 wherein decoding, using the CCE avoidance information, the second CCE associated with the second UE simulated by the multi-UE simulator includes using the CCE avoidance information to exclude the first CCE successfully identified as being associated with the first UE from being decoded for the second UE.

8. The method of claim 1 wherein the CCE avoidance information utilizes a claimed CCEs data structure indicating locations associated with decoded CCEs or an unclaimed CCEs data structure indicating locations associated with potential CCEs for decoding.

9. A system for enhanced channel control element (CCE) decoding, the system comprising:
a multi-UE simulator including:
a processor; and
an enhanced CCE decoder implemented using the processor, wherein the enhanced CCE decoder is configured to receive physical downlink control channel (PDCCH) data from an evolved node B (eNode B) under test and to decode, using channel control element (CCE) avoidance information for avoiding at least a first CCE successfully identified as being associated with at least a first UE simulated by the multi-UE simulator, a second CCE group location associated with a second UE simulated by the multi-UE simulator.

10. The system of claim 9 wherein the enhanced CCE decoder is configured to update, after each successful decoding of CCEs for each simulated UE, the CCE avoidance information for progressively reducing a search space for decoding CCEs during a CCE group processing cycle.

11. The system of claim 10 wherein the CCE group processing cycle includes a transmission time interval (TTI) or an amount of processing for decoding CCEs associated with simulated UEs in a CCE group.

12. The system of claim 9 wherein the enhanced CCE decoder is configured to update the CCE avoidance information to include or exclude information indicating the second CCE.

13. The system of claim 12 wherein the enhanced CCE decoder is configured to determine whether the second CCE is valid for the second UE prior to updating the CCE avoidance information.

14. The system of claim 13 wherein the enhanced CCE decoder is configured to decode the second CCE into DCI and determining whether the DCI satisfies an error tolerance value.

15. The system of claim 9 wherein the enhanced CCE decoder is configured to decoding, using the CCE avoidance information, the second CCE associated with the second UE simulated by the multi-UE simulator by using the CCE avoidance information to exclude the first CCE successfully identified as being associated with the first UE from being decoded for the second UE.

16. The system of claim 9 wherein the CCE avoidance information utilizes a claimed CCEs data structure indicating locations associated with decoded CCEs or an unclaimed CCEs data structure indicating locations associated with potential CCEs for decoding.

17. A non-transitory computer readable medium having stored thereon executable instructions that when executed by a processor of a computer cause the computer to perform steps comprising:
in a multi-UE simulator:
receiving physical downlink control channel (PDCCH) data from an evolved node B (eNode B) under test; and
decoding, using channel control element (CCE) avoidance information for avoiding at least a first CCE successfully identified as being associated with at least a first UE simulated by the multi-UE simulator, a second CCE associated with a second UE simulated by the multi-UE simulator.

18. The non-transitory computer readable medium of claim 17 wherein the CCE avoidance information is updated, after each successful decoding of CCEs for each simulated UE, to include information for progressively reducing a search space for decoding CCEs during a CCE group processing cycle.

19. The non-transitory computer readable medium of claim 18 wherein the CCE group processing cycle includes a transmission time interval (TTI) or an amount of processing for decoding CCEs associated with simulated UEs in a CCE group.

20. The non-transitory computer readable medium of claim 17 comprising:
updating the CCE avoidance information to include or exclude information indicating the second CCE.

* * * * *